J. G. WALLMANN.
ELECTRIC RADIATOR.
APPLICATION FILED SEPT. 25, 1920.
1,430,706.
Patented Oct. 3, 1922.
3 SHEETS—SHEET 3.
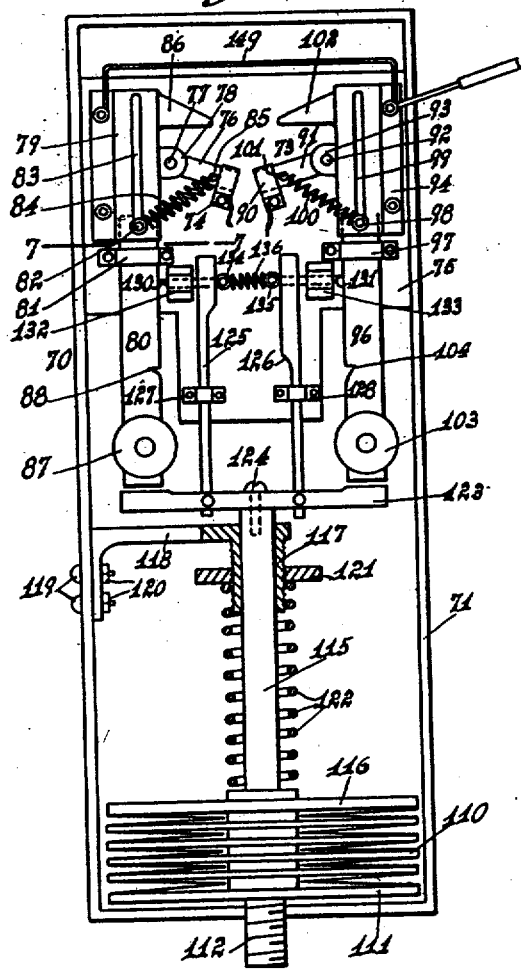
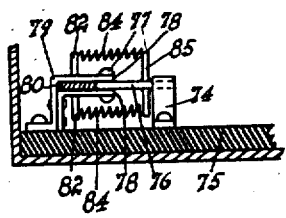
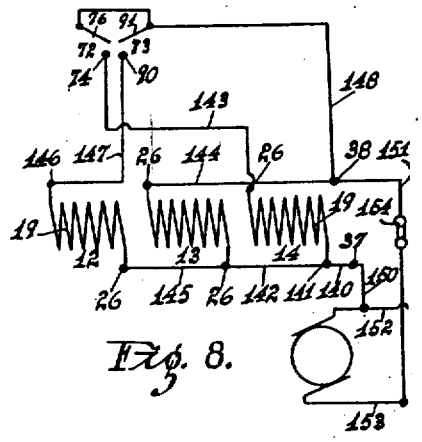
Inventor
Johann G. Wallmann.
By Harry C. Schroeder
Attorney Patented Oct. 3, 1922.

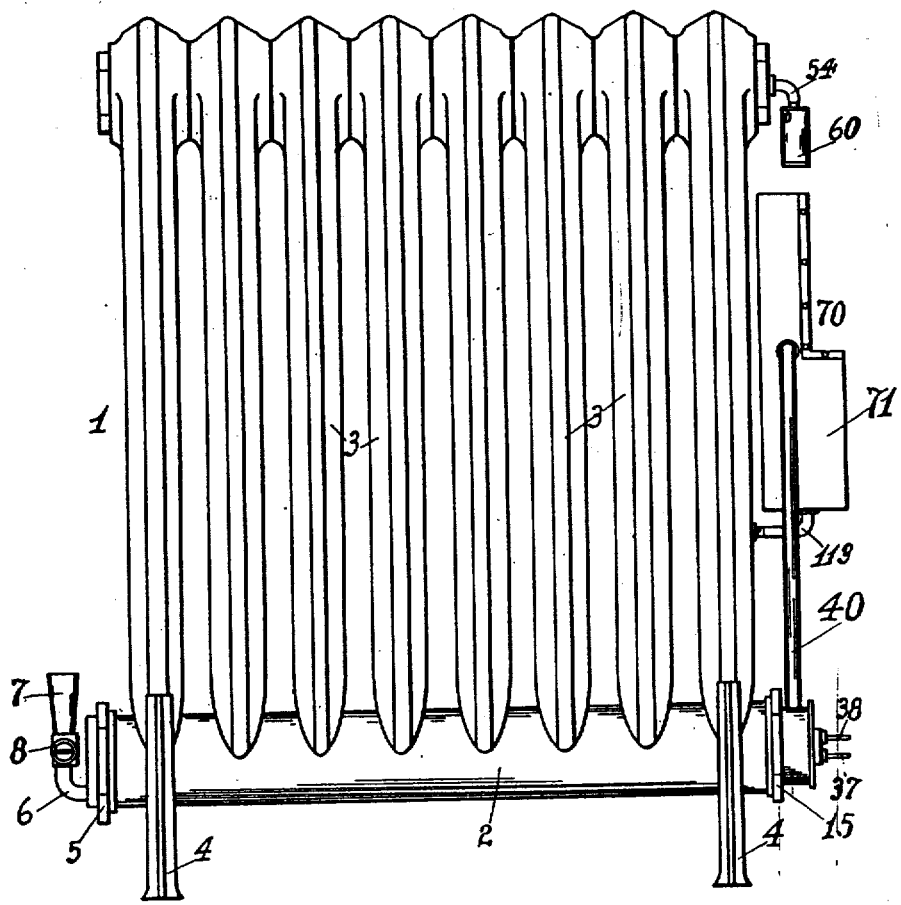
Inventor
Johann G. Wallmann.

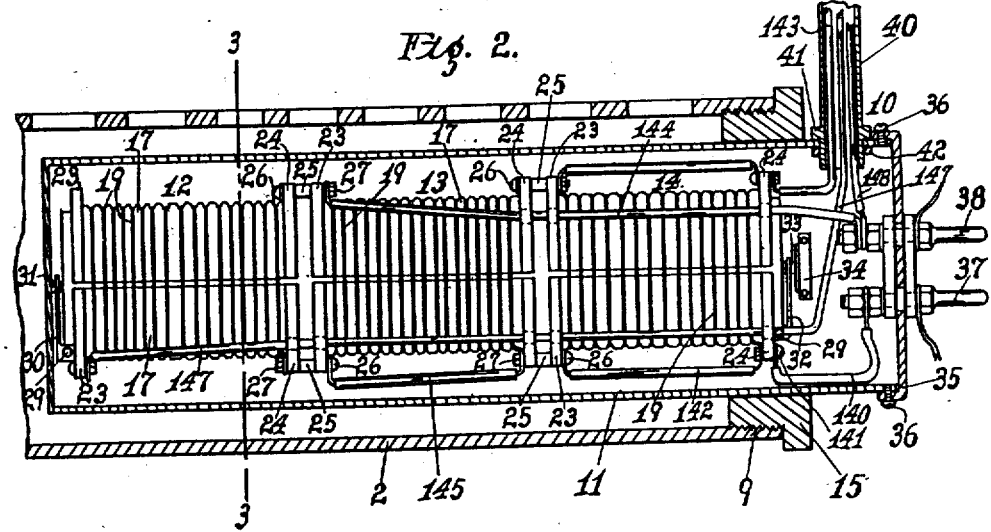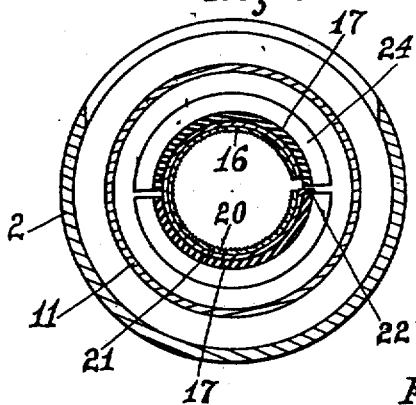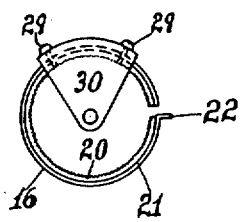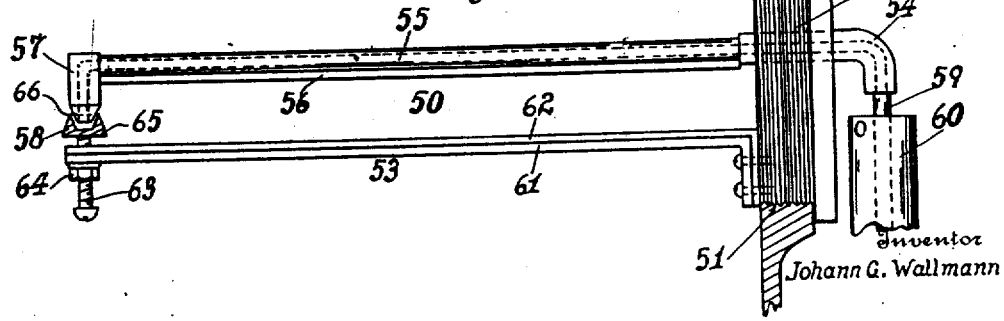

1,430,706

UNITED STATES PATENT OFFICE.

JOHANN G. WALLMANN, OF OAKLAND, CALIFORNIA.

ELECTRIC RADIATOR.

Application filed September 25, 1920. Serial No. 412,762.

*To all whom it may concern:*

Be it known that I, JOHANN G. WALLMANN, a citizen of the United States, residing at Oakland, in the county of Alameda and State of California, have invented certain new and useful Improvements in Electric Radiators, of which the following is a specification.

My invention is an electric steam radiator and its object is to provide a radiator of this type which will be highly efficient and which may be manufactured and sold at a reasonable cost.

My radiator consists of an electric heater composed of a plurality of heating units, a cold air escape device, and a governor switch; said cold air escape device being adapted to allow the cold air to escape from the radiator when heated by said heater, and said governor switch being adapted to cut out one or more units of the heater as the temperature of the radiator rises above a predetermined degree.

Referring to the annexed drawings in which my invention is illustrated and which forms a part of this specification, Figure 1 is a front elevation of my electric steam radiator.

Figure 2 is a vertical longitudinal section of the electric heater.

Figure 3 is a cross section of the electric heater taken on line 3—3 of Figure 2.

Figure 4 is an end view of one of the heating units.

Figure 5 is a side view of the thermal cold air escape controlling device.

Figure 6 is a vertical section of the electric governor switch.

Figure 7 is a fragmentary sectional view of the governor switch taken on line 7—7 of Figure 6.

Figure 8 is a diagrammatic view of the electric unit of my invention.

In the drawing, 1 indicates a radiator casing which comprises a horizontal boiler 2 and a plurality of vertical steam chambers 3 spaced a short distance apart, extending upwardly from said boiler and communicating with each other at their upper end, the casing being mounted on legs 4. A head 5 is screwed into one end of the boiler 2, through which head extends a pipe 6, said pipe extending vertically and communicating with a funnel 7, a valve 8 being interposed between the pipe and the funnel. The other end of the boiler has an internal thread 9. An electric heater 10 includes a cylindrical casing 11 and a plurality of electric heating units 12, 13 and 14 mounted in said casing, which is secured in a threaded flange 15 which screws into the thread 9 and detachably mounts the heater in the boiler 2. Each of said heating units includes a split cylindrical core 16, a pair of semi-cylindrical spool members 17 of insulation surrounding said core, and a conducting wire 19 wound around said spool members. The core 16 includes two walls of different materials, an inner wall 20 preferably of brass and an outer wall 21 preferably of steel, said walls being brazed together. The inner surface of the wall 20 is corrugated to provide sufficient heat radiating surface to enable the core to cool and contract correspondingly with the contraction of the wires 19. A flange 22 extends outwardly from one edge of the outer wall 21 of the core 16 between two adjacent edges of the spool members 17. Flanges 23 and 24 extend outwardly from the respective ends of the spool members 17. Spacers 25 are interposed between the adjacent flanges 24 and 23 of the spool members of units 12 and 13 and the units 13 and 14, and the units 12 and 13 and the units 13 and 14 are held together end-to-end a short distance apart by bolts 26 and nuts 27, said bolts extending through said adjacent flanges and the spacers therebetween. The core 16 of the unit 12 is detachably secured by screws 29 at one end to a supporting member 30 which is mounted on a stud 31 on the inner end wall of the casing 11, and the core 16 of the unit 14 is detachably secured at its outer end by screws 29 to a supporting member 32 mounted on a stud 33 on a bracket 34 secured to the inside of the casing 11, said studs being coaxial with the casing 11 and the cores of the units 12, 13 and 14, thus mounting the units centrally within the casing 11. The outer end of the casing 11 is closed by a cap 35 which is secured on the casing by screws 36. Binding posts 37 and 38 are mounted in the cap 35 for connecting the units 12, 13 and 14 to a commerical circuit. The lower end of a lead conduit 40 extends into the casing 11, a flange 41 being formed on the conduit near its lower end which rests against the outside of the casing, and a nut 42 screwing on the lower end of the conduit against the inside of the casing, whereby said conduit is detachably secured at its lower end in the casing.

A thermal cold air escape controlling device 50 is mounted in the upper communicating ends of the steam chambers 3, one of the outer chambers being provided with a threaded opening 51 in its outer side wall in which screws a plug 52 forming part of the controlling devices. Said device also includes a thermal bar 53 secured at one end to the inside of the plug 52, an elbow 54 extending through the plug 52 and screw seated therein, a bronze tube 55 secured at one end in the inner end of the elbow 54, a steel bar 56 secured to the under side of the tube 55, a nipple 57 connected to the other end of said tube 55 and the adjacent end of bar 56, a cup 58 mounted on the inner end of the bar 53 adjacent the end of said nipple, and a tube 59 connected to the outer end of the elbow 54 and a condenser 60 on the outside of the radiator into which the tube 59 extends. The thermal bar 53 includes a bronze bar 61 and a steel bar 62 which are brazed or otherwise secured together. The cup 58 is mounted on the end of a set screw 63 seated in the inner end of the bar 53. A lock nut 64 screws on the screws 63 against the bar 53. The cup 58 has a conical inner surface 65 into which is adapted to fit the conical end 66 of the nipple 57 as will be more fully described.

A governor switch 70 is provided for cutting out the heating units 12 and 14 and when the heat of the radiator becomes too great and for closing the circuit of said units when the radiator cools. The governor switch will be described in detail. In the upper part of a casing 71 is mounted a pair of knife switches 72 and 73. The switch 72 includes a clip 74 secured to a plate of insulation 75 mounted in the casing 71 and a blade 76 pivoted by a pin 77 to and between a pair of ears 78 extending from a vertical guideway 79 secured to the plate 75. Pins 82 on the upper end of bar 80 project through vertical slots 83 in the guideway 79, to the outer end of each of which pins is connected one end of a spring 84, the other end of said spring being connected to pins 85 on the outer end of the switch blade 76. A lug 86 projects from the upper end of the guideway 79 for limiting the opening movement of the switch blade 76. On the lower end of the bar 80 is secured a weight 87 which normally holds the bar in its lowermost position which is determined by the engagement of the pin 82 with the lower end of the slot, in which position of the bar and pin the spring 84 holds the switch 72 closed. In the inner edge of the bar 80 just above the weight 87 is a notch 88. The switch 73 includes a clip 90 secured to the plate 75 and a blade 91 pivoted by pivot 92 to and between a pair of ears 93 extending from a vertical guideway 94 secured to the plate 75. In the guideway 94 is mounted a vertical sliding bar 96 which also extends through a strap 97 secured to the plate 75. Pins 98 project from the upper end of bar 96 through vertical slots 99 in the guideway 94, to the outer end of each of which pins is secured one end of a spring 100, the other end of said spring being connected to pins 101 on the outer end of the switch blade 91. A lug 102 projects from the upper end of the guideway 94 for limiting the opening movement of the switch blade 91. On the lower end of the bar 96 is secured a weight 103 which normally holds the bar in its lowermost position which is determined by the engagement of the pin 98 with the lower end of the slot 99, in which position of the bar and pin the spring 100 holds the switch 73 closed. In the inner edge of the bar 96 above the weight 103 is a notch 104. In the bottom of the casing 71 is mounted a bellows 110 from the lower stationary head 111 of which extends a nipple 112 to which is connected a steam pipe 113 leading from one of the outer steam chambers 3. A plunger 115 extends vertically from the upper movable head 116 of the bellows 110 through a bearing 117 on a bracket 118 secured to the casing 71 by screws 119 and nuts 120 screwing on the inner end of said screws. The bearing 117 is externally threaded and a nut 121 screws on said bearing. A spring 122 surrounding the plunger 115 bears at one end upon the bellows head 116 and its other end against the nut 121. To the upper end of the plunger 115 is secured a cross bar 123 by means of a screw 124. Vertical cams 125 and 126 are secured at their lower end to the cross bar 123 and extend through straps 127 and 128 secured to the plate 75. Horizontal latches 130 and 131 are slidably mounted in guideways 132 and 133 secured to the plate 75 between the bars 80 and 96, on the inner end of which latches are journaled rollers 134 and 135 which engage the cams 125 and 126 respectively, a spring 136 being interposed between the inner ends of the latches to maintain said rollers in engagement with said cams. The upper end of the tube 40 connects to and into the governor switch casing 71 about midway between the bottom and top of the casing.

The heater circuit is as follows: A lead 140 connects to binding post 37 and to a binding post 141 on the flange 24 of the lower spool member 17 of unit 14. To the binding post 141 is also connected one end of wire 19 of unit 14 and one end of a lead 142, the other end of said wire 19 being connected to a bolt 26 which connects the upper spool members 17 of units 13 and 14, and the other end of lead 142 being connected to a bolt 26 which holds two lower spool members 17 of the units 13 and 14 together. One end of a lead 143 is connected to the bolt 26 to which the wire 19 of unit 14 is connected, the other end of said lead being connected to the contact clip 74 of the switch 72 of the governor switch. One end of the wire 19 of the unit 13 is connected to the bolt 26 to which the lead 142 is connected, the other end of said wire being connected to a bolt 26 which holds the upper spool members 17 of the units 12 and 13 together. One end of a lead 144 is connected to the bolt 26 which holds the upper spool members of the units 12 and 13 together, and to which the wire 19 of unit 13 is connected the other end of said lead 144 being connected to the binding post 38. A lead 145 is connected at one end to the bolt 26 to which the lead 142 is connected and at its other end to a bolt 26 which holds the lower spool members 17 of the units 12 and 13 together. One end of the wire 19 of the unit 12 is connected to the bolt 26 to which the lead 145 connects, and which connects the lower spool members of units 12 and 13, the other end of said wire being connected to a binding post 146 on the flange 23 of the upper spool member of unit 12. A lead 147 connects at one end to the binding post 146 and at its other end to the clip contact 90 of the switch 73 of the governor switch. A lead 148 is connected at one end to the binding post 38 and at its other end to the blade 91 of switch 73. A lead 149 connects the blades 91 and 76. The leads 143, 147 and 148 extend through the tube 40.

Leads 150 and 151 of a local circuit which are connected at one end to the mains 152 and 153 of a commercial circuit, are connected at their other end to the binding posts 37 and 38 respectively. A switch 154 is interposed in the lead 151. The operation of my invention is as follows:

The valve 8 is opened and the boiler 2 filled with water through the funnel 7. The valve 8 is then closed and the switch 154 is closed and the heater 10 heats the water in the boiler 2, the electric current passing from main 152, through lead 150, binding post 37, lead 140, binding post 141, lead 142, bolt 26, wire 19 of unit 13, bolt 26, lead 144 and switch 154 to main 153; from binding post 141 through wire 19 of unit 14, bolt 26 and lead 143 to the closed switch 72, through switch 72 through lead 149 to blade 91 of switch 73; from bolt 26 to which the lead 142 is connected, through lead 145, bolt 26 and wire 19 of unit 12, binding post 146 and lead 147 to closed switch 73; and from switch 73 through leads 148 and 151 through switch 154 to main 153. Steam is generated in the boiler which fills the steam chambers 3 and forces the cold air out of the radiator through the space between the interior of the cup 58 and the end of the nipple 57, through the nipple, tube 55, elbow 54, pipe 59 and condenser chamber 60 into the atmosphere. When the cold air has passed out of the radiator the action of the steam on the thermal bar 53 and tube 55 and bar 56 causes said bars and tube to expand so that the inner end of the bar 53 and the inner end of the tube 55 and bar 56 move toward each other and the conical end 66 of the nipple 57 seats tightly in the conical inner surface 65 of the cup 58 and prevents steam from passing out of the radiator through said nipple and tube, and the elbow 54 and pipe 59.

If the steam in the radiator expands beyond a predetermined degree, the steam passing through pipe 113 and nipple 112 expands the bellows 111 and forces the plunger 115, cross bar 123 and the cams 125 and 126 upwardly, and the cross bar 123 engaging the lower end of the slide bars 80 and 96 forces said bars upwardly until the pins 82 and 98 pass the switch pivots 77 and 92, whereupon the springs 84 and 100 swing the switch blades 76 and 91 upwardly, open the switches 72 and 73 and shut off the current through the units 12 and 14, while the lower surfaces of the cams 125 and 126 are brought opposite the rollers 134 and 136 and the notches 88 and 104 brought opposite the latches 130 and 131, whereupon the spring 136 forces said latches into said notches respectively and the bars 80 and 96 are held up and the switches 72 and 73 held open. The radiator then cools and the steam contracts whereupon the spring 122 contracts the bellows 110 and forces the plunger 115, cross bar 123 and cams 125 and 126 downwardly. The high surface of the cam 126 first engages the roller 135 and withdraws the latch 131 from the notch 104, and the weight 103 lowers the bar 96, whereupon the spring 100, as soon as the pin 98 passes below the switch pivot 92, swings the switch blade 91 down into the clip 90, closes the switch 73 and reestablishes the circuit through the unit 12. The high surface of the cam 125 then engages the roller 134 and withdraws the latch 130 from the notch 88 and the weight 87 lowers the bar 80, whereupon the spring 84, as soon as the pin 82 passes below the switch pivot 77, swings the switch blade 76 down into the contact slip 74, closes the switch 72 and reestablishes the circuit through the heat unit 14. The cooling of the radiator creates a partial vacuum therein, which draws any water in the condenser 60 from the condensed steam back through pipe 59, elbow 54, tube 55 and nipple 57 into the radiator, the nipple end 66 being at this time withdrawn from the inner surface 65 of the cup 58.

The heat of the units 12, 13 and 14 expands their cores 16 and spreads their spool members 17 which take up the expansion of the wires 19 and prevent the strands of the expanded wires from contacting with each other and short circuiting the unit. The corrugated inner surface of the cores provides sufficient radiating surface to radiate the heat of the core fast enough to enable the core to contract correspondingly with the contraction of the wires 19. When the core 16 expands the flange 22 engages one edge of the lower spool member 17 and turns said member so that said edge and the adjacent edge of the upper spool member will be spaced apart considerably to allow the heat to escape rapidly from the inside of the core when the heat of the unit is turned off and the radiator cools.

Having described my invention, I claim:

1. A heat unit including a split shell thermostatic core, a pair of spool insulating members fitting on said core, and a conducting wire wound around said spool members.

2. A heat unit including a split shell thermostatic core, a pair of spool insulating members fitting on said core, and a conducting wire wound around said spool members, one end of said core being bent outwardly between said spool members.

3. A heater including a casing, a plurality of heat units in said casing, each unit including a split shell thermostatic core, a pair of spool insulating members fitting said core, and a conducting wire wound around said spool members, means for detachably connecting said units a short distance apart, and means for detachably mounting said units in said casing.

4. A heater including a casing, a plurality of heat units in said casing, each unit including a split shell thermostatic core, a pair of spool insulating members fitting said core, and a conducting wire wound around said spool members, flanges on the ends of said spool members, spacers between the flanges of spool members of adjacent units, bolts extending through the flanges of the adjacent units and the spacers therebetween and nuts screwing on said bolts to hold the adjacent units together, and means for detachably mounting the outer end of the cores of the outer units in the casing.

5. A heat unit comprising two metal sheets of materials having different coefficients of expansion bent to form a core, spool members of insulating material fitting said core, and a conducting wire wound around said core.

6. An electric heat unit including split metal shell core, the inner surface of said core being corrugated, a pair of spool members of insulating material fitting said core, and a conducting wire wound around said spool members.

In testimony whereof I affix my signature.

JOHANN G. WALLMANN.